Figure 1:
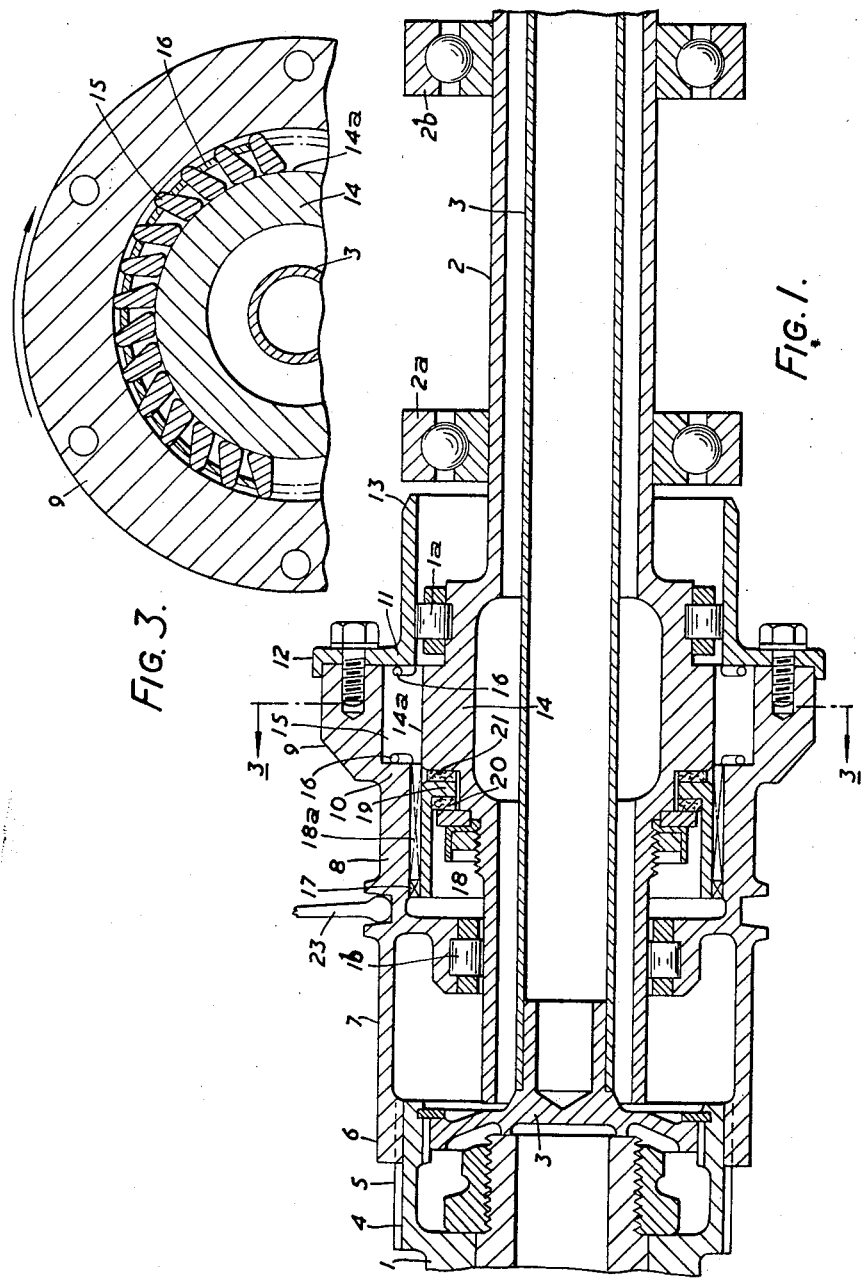

July 30, 1963  B. W. BARLOW  3,099,339
UNI-DIRECTIONAL DRIVING DEVICES
Filed March 30, 1961  2 Sheets-Sheet 2

INVENTOR
BENJAMIN W. BARLOW
BY
Watson, Cole, Grindle & Watson
ATTORNEYS

United States Patent Office 3,099,339
Patented July 30, 1963

3,099,339
UNI-DIRECTIONAL DRIVING DEVICES
Benjamin William Barlow, Wembley, England, assignor to The De Havilland Engine Company Limited, Leavesden, England, a company of Great Britain
Filed Mar. 30, 1961, Ser. No. 99,592
Claims priority, application Great Britain Apr. 1, 1960
5 Claims. (Cl. 192—37)

This invention relates to uni-directional driving devices for transmitting rotary motion and has as its object to provide a device which can at will either be caused to be operative, that is to say put into a condition in which it will transmit rotary motion in one direction but not in the other, or can be rendered inoperative, that is to say put in a condition in which it will not transmit rotary motion in either direction to avoid unnecessary wear.

More specifically, the present invention relates to a free-wheel device, i.e., one in which the driven member can, if necessary, over-run the driving member. In all types of free-wheel devices this over-running causes wear. In many types of free-wheel this wear is not too objectionable, particularly if there are large cam surfaces or wedges which will in effect absorb the wear. However, in some types of free-wheel devices any such wear caused by over-running will be most objectionable. This applies particularly to the sprag type of clutch as illustrated in the instant specification and drawings, where there are a large number of inclined rocking sprags. The tolerances and clearances in such a construction must be very exact, and if the sprags or the bearing surfaces wear the clutch may become inoperative or a number of sprags may become inoperative, which will overload the remaining sprags. The same arguments apply to other types of free-wheel clutch and the invention is not therefore applicable only to sprag-type clutches.

The present invention provides a construction in which the intermediate members of the clutch can be withdrawn into an inoperative position where they will be totally out of action, that is to say, out of all contact with any moving parts and subject to no load. For this purpose, there is provided a control member on to which the sprags are therefore contained between the two parts which rotate together. No load is transmitted through sprags and they are not subject to wear of any sort.

A uni-directional driving device for transmitting rotary motion according to the present invention comprises co-axial driving and driven parts, a series of intermediate members so formed and arranged between the driving and driven parts that they normally operate automatically to permit relative rotation between these parts in one direction but to prevent relative rotation between the parts in the opposite direction, and a control member arranged to rotate with but to be capable of axial movement relatively to the driving or driven part and formed and arranged so that in one relative axial position (the "operative" position) it permits the intermediate members to extend between the driving and driven parts so as to be operative to prevent relative rotation in the appropriate direction, and in another relatively axial position (the "inoperative" position) maintains the intermediate members out of engagement with that one of the driving and driven parts with which the control member rotates so as to render the intermediate members inoperative to prevent relative rotation between the driving and driven parts in either direction.

In a convenient arrangement the intermediate members, when the control member is in its "operative" position, are arranged to engage a cylindrical working surface on that one of the driving and driven parts with which the control member rotates, and the control member is provided with a cylindrical control surface of substantially the same diameter as the cylindrical working surface, the arrangement being such that when the control member is moved into its "inoperative" position this takes the intermediate members out of engagement with the cylindrical working surface and into engagement with the cylindrical surface on the control member. Thus, when the control member is in its "inoperative" position, the intermediate members extend between such control member and that one of the driving and driven parts with which the control member rotates.

The intermediate members may be formed and arranged in various ways. For example they might be in the form of balls or rollers lying in spaces formed by tapered recesses in the driving or driven part and projecting into engagement with a cylindrical surface on the other of these two parts.

In a preferred arrangement, however, the intermediate members are in the form of short "sprags" one end of each of which is arranged for pivotal movement relatively to the driving or driven part about an axis parallel to the axis of rotation, while its other end (hereinafter called its free end) extends into engagement with a cylindrical surface on the other of these two parts, each sprag extending in a direction which is predominantly radial with respect to the axis of rotation but has a small tangential component in the appropriate sense. Spring means are provided tending to maintain the free ends of the sprags in engagement with the cylindrical surface. Thus, when the control member is in its "operative position," the free ends of the sprags are maintained in engagement with such cylindrical surface with a light pressure during the rotary movement of such surface relatively to the sprags in the direction of the tangential component referred to. Whereas, if and when said cylindrical surface tends to have rotational movement relatively to the sprags in the opposite direction, the sprags become wedged in compression between the driving and driven parts and thus act to transmit rotation between the driving and driven parts.

Figure 2:
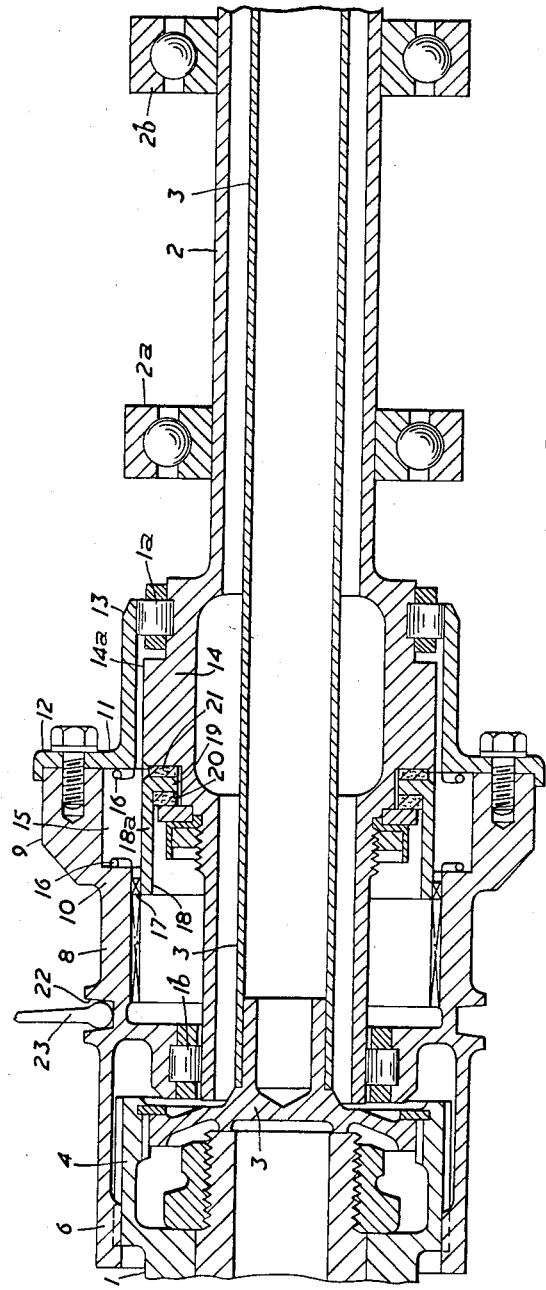

One form of transmission apparatus including a uni-directional driving device according to the invention is illustrated by way of example in the accompanying drawings, in which, FIGURE 1 is a sectional side elevation in a plane containing the axis of rotation of the driving and driven members, with the parts in their "operative" position, FIGURE 2 is a similar view to FIGURE 1 showing the parts in their "inoperative" position, and FIGURE 3 is a cross-section on the line III—III of FIGURE 1.

The transmission apparatus shown in the drawings comprises co-axial driving and driven shafts 1 and 2, the driving shaft 1 having a projection 3 lying within the driven shaft 2 as shown and therefore constantly driven by it. The driving shaft 1 is provided with an enlarged end 4 having external splines 5 which are engaged by the internally splined end 6 of an axially slidable sleeve structure 7 extending over the adjacent end of the driven shaft 2 and supported thereon by roller bearings 1a, 1b. The driven shaft 2 may be assumed to be supported on ball bearings 2a, 2b from a fixed part.

The sleeve structure 7 constitutes the driving member of a uni-directional driving device according to the invention and includes, in addition to its internally splined end 6, an intermediate part 8, which is also internally splined, and a hollow annular housing comprising an outer circumferential wall 9 and two end walls 10, 11, the latter of which is formed by a separate member 12 secured to the sleeve structure 7 and having a tubular projection 13.

When the device is in the "operative" position shown in FIGURE 1, the circumferential wall 9 of the annular housing lies in the same plane as an enlargement 14 of the driven shaft 2, which enlargement constitutes the driven member of the uni-directional driving device and has a cylindrical outer surface 14a. Arranged within the annular housing 9, 10, 11 are a series of sprag members 15 each of which is pivotally connected to the outer circumferential wall 9 of the housing and in the "operative" position engages the cylindrical surface 14a of the enlargement 14. The sprag members 15 are acted upon by springs, indicated at 16, tending to rock them about their pivotal points, and have such lengths, as shown in FIGURE 3 that, in the "operative" position their inner ends are maintained in engagement with the cylindrical surface 14a of the enlargement 14, and each of the sprag members then extends in a direction which is predominately radial, but has a small tangential component. The tangential component referred to is in the same directional sense for all the sprag members, so that, when relative rotation occurs between the annular housing 9 and the enlargement 14 on the driven shaft in one direction, the inner ends of the sprag members slide over the cylindrical surface 14a of the enlagement 14, whereas if relative rotation in the opposite direction tends to occur, the sprag members 15 immediately grip the cylindrical surface 14a of the enlargement 14 to prevent relative rotation in such opposite direction. Thus, in the "operative" position, the apparatus acts as a uni-directional driving device.

Arranged within the internally splined intermediate part 8 of the sleeve structure 7 and connected to it by splines 17 so as to rotate with it, is an externally cylindrical member 18 constituting a control sleeve. The splines 17 on the control sleeve 18 are limited, as shown, to the end of the sleeve remote from the sprag members 15, and the sleeve 18 carries at its end remote from the splines 17 an internal flange 19 which lies and is capable of rotation between two thrust washers 20, 21, on the driven shaft 2 so that the control sleeve 18 is held from axial movement relatively to the driven shaft 2 while rotating with the driving shaft 1 and sleeve structure 7.

The control sleeve 18, apart from the end where the external splines 17 are formed thereon has a cylindrical external surface 18a of the same diameter as and lying adjacent to the adjacent end of the cylindrical surface 14a of the enlargement 14 and, by sliding the sleeve structure 7 as a whole axially therefore to the left in FIGURE 1 into the position shown in FIGURE 2, the inner ends of the sprag members 15 can be brought out of engagement with the cylindrical surface 14a of the enlargement 14 into engagement with the cylindrical surface 18a of the control sleeve 18 which, as stated, rotates with the sleeve structure 7. In this position therefore the sprag members merely extend between two parts which rotate together, and the uni-directional driving device is therefore in its "inoperative" position.

The sleeve structure 7 is conveniently provided with a circumferential groove formed between flanges as indicated at 22 for engagement by a fork or like operating members indicated at 23 by which the sleeve structure 7 can thus be moved axially from its operative position shown in FIGURE 1 into its inoperative position shown in FIGURE 2 and vice versa.

What I claim as my invention and desire to secure by Letters Patent is:

1. A uni-directional driving device for transmitting rotary motion comprising co-axial driving and driven parts, a series of intermediate members so formed and arranged between the driving and driven parts that they normally operate automatically to permit relative rotation between these parts in one direction, but prevent relative rotation between the parts in the opposite direction, and a control member splined to one of the parts, and said control member being formed and arranged so that in one relative axial position it permits the intermediate members to extend between the driving and driven parts so as to be operative to prevent relative rotation in the appropriate direction, and in another relative axial position the control member itself engages the intermediate members and maintains the intermediate members out of engagement with that one of the driving and driven parts with which the control member does not rotate so as to render the intermediate members totally inoperative.

2. A uni-directional driving device for transmitting rotary motion as claimed in claim 1 in which, in their operative position the intermediate members engage cylindrical working surfaces on the driving and driven parts, and in which the control member is provided with a cylindrical control surface of substantially the same diameter as the cylindrical working surface on that one of the driving and driven parts with which the control member does not rotate.

3. A uni-directional driving device for transmitting rotary motion, comprising two coaxial main rotary parts, of which one is a driving member and the other a driven member, a series of intermediate members so formed and arranged between the two main rotary parts that they normally operate automatically to permit relative rotation between these parts in one diretion, but prevent relative rotation between the parts in the opposite direction, a control member splined to one of the two main rotary parts, and means for moving the intermediate members out of engagement with the other rotary part and into engagement with the control member, so as to render the intermediate members totally inoperative.

4. A uni-directional driving device as claimed in claim 3, in which one of the main rotary parts is movable axially relative to the other main rotary part, and the intermediate members are constrained in an axial direction to be located axially by one of the two main rotary parts.

5. A uni-directional driving device as claimed in claim 3, in which the intermednate members are in the form of tilting sprags and engage cylindrical surfaces on the two main rotary parts.

References Cited in the file of this patent
UNITED STATES PATENTS

| | | |
|---|---|---|
| 2,286,760 | Peterson | June 16, 1942 |
| 2,291,151 | Dunn | July 28, 1942 |
| 2,514,569 | Enquist | July 11, 1950 |
| 2,930,461 | Dodge | Mar. 29, 1960 |
| 2,934,974 | Schoepe | May 3, 1960 |